United States Patent [19]
McCabe

[11] 3,873,139
[45] Mar. 25, 1975

[54] PIPE JOINT

[75] Inventor: John Stanton McCabe, Naperville, Ill.

[73] Assignee: Chicago Bridge & Iron Company, Oak Brook, Ill.

[22] Filed: Oct. 29, 1973

[21] Appl. No.: 410,787

[52] U.S. Cl.............. 285/286, 285/419, 403/272
[51] Int. Cl............................................ F16l 13/02
[58] Field of Search ...... 285/286, 419, 373; 138/99; 403/272

[56] References Cited
UNITED STATES PATENTS

| | | | |
|---|---|---|---|
| 1,302,412 | 4/1919 | Murray | 285/286 |
| 1,446,274 | 2/1923 | Roberts | 285/286 X |
| 2,893,758 | 7/1959 | Dufour et al. | 285/286 |
| 3,150,690 | 9/1964 | Danielson et al. | 138/99 |
| 3,791,751 | 2/1974 | Vey | 285/419 X |

Primary Examiner—Thomas F. Callaghan
Attorney, Agent, or Firm—Merriam, Marshall, Shapiro & Klose

[57] ABSTRACT

A pipe joint with crack propagation resistance comprising a first pipe end, a second pipe end in axial alignment with, and close to, the first pipe end, a tubular sleeve containing and encircling the first pipe end and the second pipe end, said tubular sleeve having at least two elongated sections which are welded together at abutting edges and the ends of the sleeve sections are welded to the adjacent pipes, and a hole in each elongated weld joint wider than the weld and extending between the two pipe ends, and optionally means sealing the hole without welding in the hole.

8 Claims, 5 Drawing Figures

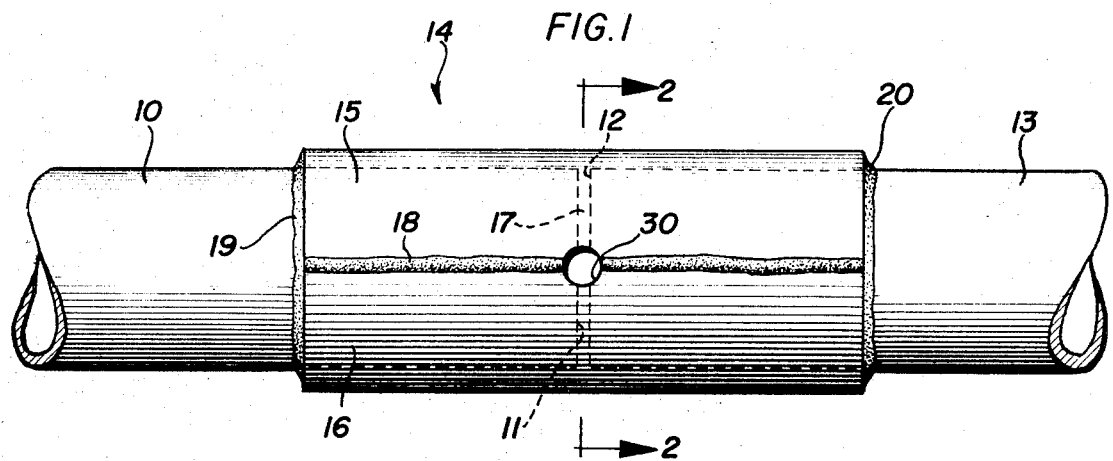
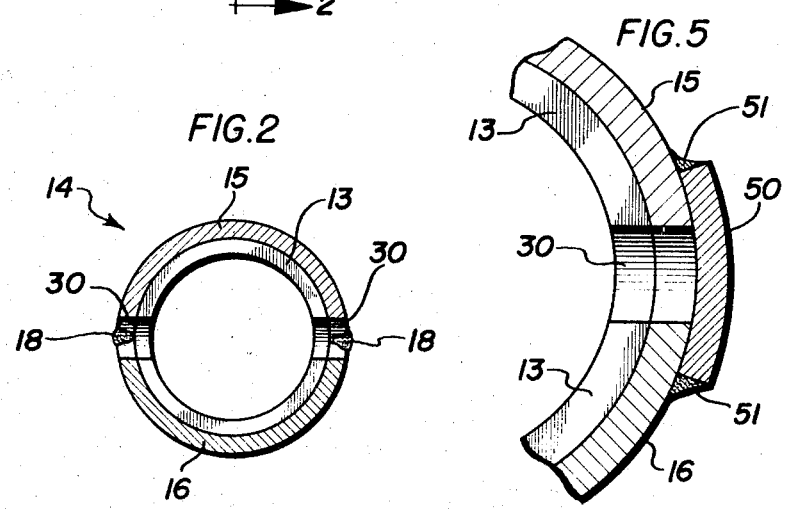
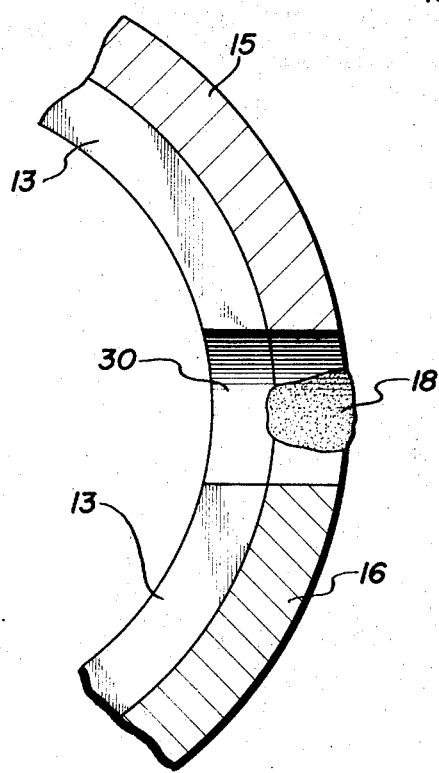
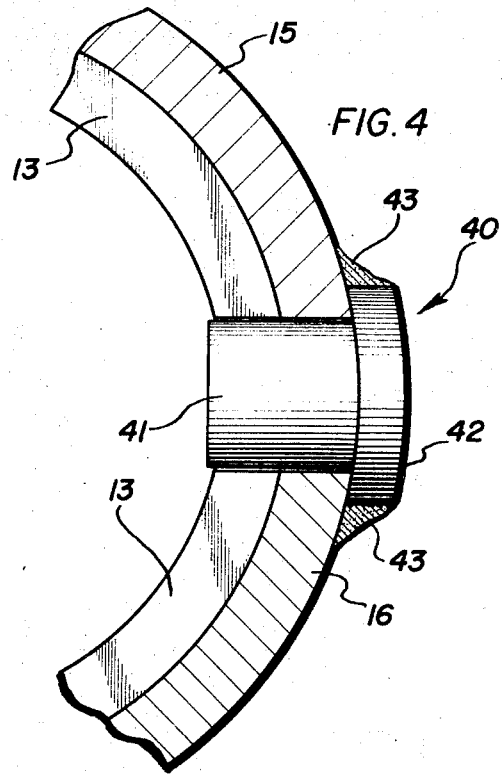

# 3,873,139

PIPE JOINT

This invention relates to means for joining two objects together. More particularly, this invention provides a novel joint structure by which the ends of two pipes or tubular portions are joined together by welding in a way which permits the pipe to be used with crack propagation resistance.

It is quite common to join the ends of adjacent sections of metal pipe or tubing together to thereby form a structural support member or even a pipeline or conduit of the desired length for transporting liquids and gases. Small sized pipes and tubes are readily joined by means of conventional fittings. Large sized pipes however are more economically joined directly together, such as by welding. It is generally possible to join the two ends of pipe portions together by placing the ends in abutting contact arrangement and to then butt-weld the pipe ends together. The joint is completed by extending the weld completely around the abutting ends of the pipe portions.

In the joining of some sections of pipe it is not possible or readily feasible to bring the ends of the pipe into close abutting relationship to join the ends together by means of a weld which spans the joint. The existence of a significant gap between the adjacent ends of the pipe portions prevents the deposit of a suitable weld. A need accordingly exists for a means for joining together the ends of two pipes or tubes under such conditions.

According to the present invention there is provided a pipe joint comprising a first metal pipe end portion, a second metal pipe end portion in axial alignment with and close to the first pipe end portion, and a metal tubular sleeve containing and encircling the first end portion and the second pipe end portion. The tubular sleeve comprises at least two elongated sections which are welded together at abutting edges to form elongated weld joints. The ends of the sleeve sections are also advisably circumferentially welded to the adjacent pipe portions.

The elongated sections of the tubular sleeve can be cylindrical plates having longitudinal edges which when placed on the end portions of the pipes are located axially to the pipes. By using two cylindrical plates with each one constituting one-half of a circle of revolution, a sleeve can be made of two such sections. More than two sections can, of course, be used although it is generally unnecessary to use more.

It is also within the scope of the invention to use elongated sections which are spirally shaped and which have longitudinal abutting edges welded together spirally with respect to the axis of the pipe portions.

The area of the longitudinal welds, joining the sections together to form the tubular sleeve, which span the gap between the ends of the pipes is recognized as a crack generating zone. Apparently the lack of a back-up support for the weld deposited in such area conditions the area for the generation of cracks. Accordingly, it is a further feature of this invention to provide an improved pipe joint which eliminates the crack generating propensity of welds of the type just described. In this feature of the invention, a hole is provided in the elongated weld which spans the space or gap between the ends of the pipe portions which are joined together. The hole renders the longitudinal weld discontinuous and prevents the formation of a crack generating zone. The hole can often be left open, such as when the pipe is used as a structural support member. To provide a joint, however, which is adequate for transporting a liquid or gas in the pipe, it is necessary that the hole be suitably closed off, such as by means which avoid actual welding in the hole. Welding in the hole is to be avoided because it could lead to the reformation of a crack generating area. The hole can be readily sealed according to the invention by known mechanical means or by placing a headed plug in the hole and welding around the head of the plug directly to the tubular sleeve or by placing a metal plate over the hole and welding it around its periphery to the tubular sleeve.

The invention will be described further in conjunction with the attached drawings, in which:

FIG. 1 is a plan view of a partially completed pipe joint provided according to the invention;

FIG. 2 is a sectional view taken along the line 2—2 of FIG. 1;

FIG. 3 is an enlarged view of the longitudinal weld joining adjacent edges of the sections of the tubular sleeve shown in FIG. 2;

FIG. 4 is an enlarged view of the pipe joint of FIGS. 1 to 3 after a plug has been welded in the hole at the gap between the pipe ends; and FIG. 5 is a view of a pipe joint like that in FIG. 4 except that in FIG. 5 the hole is covered with a curved metal plate rather than with a headed plug.

So far as is practical, the same numbers will be used in the different views of the drawings to identify the same or similar parts or elements.

With reference to FIGS. 1 and 2, a first metal pipe end portion 10 is placed so that its end 11 is placed closely to but slightly spaced away from the end 12 of a second metal pipe end portion 13. A metal tubular sleeve 14 comprising a half circular cylindrical section 15, and a half circular cylindrical section 16, are positioned around and in contact with the outer surface of the pipe portions 10 and 13. The two sections of the tubular sleeve are positioned so that the gap 17 between the pipe ends 11 and 12 is approximately midway between the ends of the elongated sections making up the tubular sleeve.

A pair of elongated welds 18 joins the adjacent abutting longitudinal edges of the elongated sections 15 and 16 together. The elongated welds 18 extend for the full length of the sections 15 and 16 making up the tubular sleeve 14. Weld 19 joins one end of the tubular sleeve 14 to pipe portion 10 and weld 20 joins the other end of the tubular sleeve to pipe portion 13.

A hole 30 is located in each of the longitudinal welds 18 at the gap 17. The hole 30 is wider than the weld 18. The hole continues through the thickness of the tubular sleeve as well as through at least part of the thickness of the pipe end portions. The ends of the weld 18 adjacent the wall surface of the hole 30 thereby are placed in a form which does not promote crack propagation. Each place where a weld 18 crosses the gap 17, or the area where the ends of the pipes abut, is provided with a similar hole to provide a structural arrangement which decreases the chance for crack formation in the weld 18 or the metal adjoining the weld.

The pipe joint as described is suitable for joining pipe portions together where the resulting pipe is to function as a structural member on land or underwater.

In those instances when it is desired that the pipe joint of this invention is to be used to convey a liquid or gas, each of the holes 30 is sealed by suitable means to prevent escape of the liquid or gas. One way the hole 30 can be sealed is by placing a plug 40 in the hole. The plug 40 is comprised of a stem 41 of a diameter somewhat smaller than the hole 30 so that it fits in the hole loosely. The plug, however, has a head 42 with a periphery which extends beyond the edge of the hole 30. The peripheral edge of the head 42 is welded 43 to the tubular sleeve to thereby seal off the hole 30 in a way which decreases the likelihood of crack propagation at the longitudinal weld 18.

Instead of using a plug as described and is shown in FIG. 4, a metal plate 50, as shown in FIG. 5, can be placed over the hole 30 and welded 51 around its periphery to seal off the hole.

The hole 30 can also be sealed by mechanical means. Thus, a gasket can be placed around the hole and a cover plate placed thereover and held in place by a suitable saddle clamp.

The described pipe joint is suitably employed on land as well as underwater. Since it does not require butt welding and thereby eliminates close fit up of the pipes, it will find considerable value in making pipe joints where it is not feasible, or highly impractical, to fit up with close tolerances the pipes and other pieces used in making the joint. Furthermore, there is no need to use a back-up bar behind the weld to achieve the desired weld quality.

The foregoing detailed description has been given for clearness of understanding only, and no unnecessary limitations should be understood therefrom, as modifications will be obvious to those skilled in the art.

What is claimed is:

1. A pipe joint comprising:
   a first metal pipe end portion;
   a second metal pipe end portion in axial alignment with, and close to, the first pipe end portion;
   a metal tubular sleeve containing and encircling the first pipe end portion and the second pipe end portion;
   said tubular sleeve comprising at least two elongated sections which are welded together at abutting edges to form elongated weld joints and the ends of the sleeve sections are welded to the adjacent pipes; and
   each elongated weld joint in the sleeve having a hole therein wider than the weld, said hole extending through said weld and portions of said tubular sleeve and spanning the space between the two pipe ends whereby said hole renders the elongated weld joint discontinuous and prevents the formation of a crack generating zone.

2. A pipe joint according to claim 1 in which each said hole is sealed to prevent loss of liquid or gas.

3. A pipe joint according to claim 2 in which sealing is effected without welding in the hole.

4. A pipe joint according to claim 1 in which the sleeve is two essentially identical sections and each section covers about one-half of the pipe end portions.

5. A pipe joint according to claim 4 in which the abutting edges of the sections are axially positioned with respect to the pipe end portions.

6. A pipe joint according to claim 1 in which the means sealing the hole is a plug welded into the hole.

7. A pipe joint according to claim 6 in which the plug has a head larger than the hole and the periphery of the head is welded to the sleeve.

8. A pipe joint according to claim 1 in which the means sealing the hole is a plate over the hole welded to the sleeve.

* * * * *